United States Patent
Choudhery

(12) 
(10) Patent No.: US 6,673,874 B1
(45) Date of Patent: Jan. 6, 2004

(54) MODIFIED POLYMERS

(75) Inventor: Riaz Ahmad Choudhery, Birmingham (GB)

(73) Assignee: Imperial Chemical Industries PLC (GB)

( * ) Notice: Subject to any disclaimer, the term of this patent is extended or adjusted under 35 U.S.C. 154(b) by 0 days.

(21) Appl. No.: 09/628,192

(22) Filed: Jul. 28, 2000

Related U.S. Application Data

(60) Division of application No. 09/058,569, filed on Apr. 10, 1998, now Pat. No. 6,121,387, which is a continuation-in-part of application No. 08/575,571, filed on Dec. 20, 1995, now abandoned.

(30) Foreign Application Priority Data

Dec. 21, 1994 (GB) ............................................. 9425792

(51) Int. Cl.$^7$ .................... C09D 167/00; C09D 169/00; C09D 175/00; C09D 177/00
(52) U.S. Cl. ...................... 525/425; 525/439; 525/440; 525/444; 525/452; 525/454; 525/466; 528/272; 528/296
(58) Field of Search ................ 528/296, 272; 525/444, 425, 452, 454, 466, 439, 440

(56) References Cited

U.S. PATENT DOCUMENTS

| | | | |
|---|---|---|---|
| 3,703,488 A | 11/1972 | Morton | |
| 4,132,707 A | 1/1979 | Borman | |
| 4,147,737 A | * 4/1979 | Sein | ............................. 427/27 |
| 4,387,214 A | * 6/1983 | Passmore | .................... 528/296 |
| 4,426,478 A | * 1/1984 | Noyes | ......................... 524/361 |
| 4,740,580 A | * 4/1988 | Merck | ........................ 528/272 |
| 5,001,194 A | 3/1991 | Henton | |
| 5,068,266 A | 11/1991 | Kojima et al. | |
| 5,124,073 A | 6/1992 | Goffing et al. | |
| 5,262,510 A | * 11/1993 | Kwon | ......................... 528/112 |
| 5,296,529 A | * 3/1994 | Yukawa | ....................... 524/513 |
| 5,296,551 A | * 3/1994 | Yukawa | ....................... 525/175 |
| 5,334,669 A | 8/1994 | Ghisolfi | |
| 5,376,734 A | 12/1994 | Ghatta | |

FOREIGN PATENT DOCUMENTS

| | | |
|---|---|---|
| EP | 0 141 733 A1 | 5/1985 |
| EP | 0 233 651 A1 | 8/1987 |
| EP | 0 240 586 A1 | 10/1987 |
| EP | 0 422 282 A1 | 4/1991 |
| EP | 0 541 169 A1 | 5/1993 |
| EP | 0 566 911 A1 | 10/1993 |
| EP | 0 583 086 A1 | 2/1994 |
| WO | WO90/12656 | 11/1990 |
| WO | WO92/17543 | 10/1992 |

OTHER PUBLICATIONS

Chemical Abstracts, vol. 100, No. May 20, 1984, Columbus, Ohio, U.S.: Abstract No. 157664 a, Crosslinked Modified Polyolefins, p. 48; Column 2.

Chemical Abstracts, vol. 76, No. 10, Mar. 6, 1972, Columbus, Ohio, U.S.; abstract No. 47479X, "Water–Thinnable Vinyl or Acrylic Paint", p. 83; Column 1.

* cited by examiner

Primary Examiner—Patricia A. Short
(74) Attorney, Agent, or Firm—Kenneth J. Stachel

(57) ABSTRACT

Process for preparing a thermosetting coating composition comprising;

(a) mixing
  (i) a cleavable carbonyl polymer having an activated carbonyl group adjacent to oxygen or nitrogen, in the backbone, and having a molecular weight greater than 5,000
  (ii) a multifunctional compound having a molecular weight less than 5,000 having a functional group capable of reacting with the cleavable carbonyl polymer to cleave the polymer at the carbonyl group and bond with the cleaved polymer, the compound having a crosslinking group;

(b) reacting the mixture in an extruder, at 50 to 350° C. for 15 to 600 seconds, to cleave the polymer, and react the cleaved polymer with the functional group on the multifunctional compound (c) quenching the reaction mixture cooling prior to equilibrium reaction, to produce a functionalized cleaved polymer having crosslinking groups derived from the multifunctional compound and capable of crosslinking by heat reaction outside the extruder.

4 Claims, No Drawings

MODIFIED POLYMERS

This is a division of application Ser. No. 09/058,569 filed Apr. 10, 1998, now U.S. Pat. No. 6,121,387, which is a continuation-in-part of U.S. application Ser. No. 08/575,571 filed on Dec. 20, 1995, now abandoned.

The present invention relates to a process of preparing a coating composition and to a coating composition prepared by the process.. The invention also relates to a process of coating using the coating composition and to a coated substrate obtainable by the coating process.

Powder coatings are traditionally made by mixing powdered resin, pigment, cross-linking agent and additives uniformly in a mixer. The mixture is then usually extruded as a melt, cooled to harden the extrudate, broken up and finally milled and sieved to produce a powder. This method possesses a number of problems however. The resin types are limited to those that are brittle and amenable to dry milling when cold. The breaking up and milling steps are difficult and expensive, especially for polymers with a low glass transition temperature (Tg) or of a high molecular weight, and result in particles having a broad distribution range and an irregular shape.

Dispersion processes have enabled polymer particles of uniform size and shape to be produced without the need for a grinding and milling step. Typically, these processes involve heating the polymer to a temperature above its softening point, and dispersing in an inert liquid in the presence of a dispersing agent using high shear agitation to form a dispersion with the polymer in finely divided form, after which the dispersion is cooled to below the softening point of the polymer to harden the particles. The process is carried out in a reactor equipped with a variable speed rotor and agitator, and the reactor is heated and cooled to the desired temperatures. This heating and cooling aspect of the process can be long, often taking several hours. Another problem with this process is that the reactor cannot be used for dispersing resins of high viscosity because of poor energy transfer around the stirring device so that the dispersion efficiency decreases considerably. Also, the process can only be carried out in batches, and not on a continuous basis.

More recently, polymer dispersions have been made in an extruder as shown, for example, in EP 246,729 and U.S. Pat. No. 5,124,073. Extruders are conveying single or multi-screw mixers. In some types there may be two or more screws which rotate in the same direction, and in other types the screws may rotate in opposite directions. The use of an extruder enables polymers of high viscosity to be readily dispersed and processes to be carried out continuously. In a typical process, a polymer is melt kneaded in a first zone of the extruder and liquid and dispersant are added to the melt as it enters a second zone with the result that a dispersion of the polymer in the liquid is formed. The dispersion is then cooled and uniform spherical polymer particles of controlled dimensions are formed.

It is known from other prior art documents to process polymers in extruders. For example, EP 477,634 (BASF Corporation) describes a process for introducing additives into a polyamide or polyester melt, comprising dispersing a pigment or non pigment colorant in an at least partially volatile liquid vehicle, with a water dispersible or soluble polyamide or polyester, or copolymers thereof, feeding the resulting dispersion to a vented extruder which is extruding the polymer, and removing the volatiles through an extruder vent to obtain a substantially homogenous system, which contains the polymer and an additive. Suggested stabilisers for the system include polyalcohols.

U.S. Pat. No. 4,996,259 (BASF Aktiengesellschaft) describes aqueous synthetic wax dispersions which can be used as coating films, and which comprise a partially or completely neutralized copolymer of a $C_2$–$C_4$ olefin, and an unsaturated mono or dicarboxylic acid or dicarboxylic anhydride. The preparation occurs by neutralizing and dispersing the solid substance in an aqueous medium at above the melting point of the copolymer, by a method in which the process of neutralization and dispersion are carried out in an extruder.

U.S. Pat. No. 5,001,194, (Dow Chemical Company), describes a functionalized polymeric composition having separate phases, the first phase comprising a copolymer of monovinylidene monomer and a co-monomer, selected to have a reactive epoxide functionality. The second dispersed phase is a copolymer of an olefin monomer, and one or more ethylenically unsaturated monomers copolymerizable with the olefin monomer. An extruder can be used for the shear mixing required in the manufacturing process.

EP 173,456 (Mitsui) and EP 246,729 (Mitsui) both describe an aqueous dispersion, and process for the preparation thereof, comprising a hydrophobic thermoplastic resin, which is preferably an olefin resin, and a water insoluble or non water swelling polymer comprising a carboxylic acid salt group. The process is a dispersion one, in which the resin and polymer are melt kneaded in the presence of water, wherein phase inversion occurs, to form a stable dispersion of the resin particles in water.

U.S. Pat. No. 4,359,557 (Watkins et al), and reported in "Reactive Extrusion Principles and Practice", Polymer Processing Institute, edited by M. Xanthos, Hanser Books, 1992, describes a process for making polyethylene terephthalate (PET) fibres having low pilling properties, in which ethylene glycol and PET are admixed in an extruder, with the resultant processed fibre being held at a constant length whilst being heat set to a controlled length. A larger viscosity reduction was observed when the processed polymer contained ethylene glycol than when it was processed without ethylene glycol.

Reactions to increase the molecular weight of certain polymers by reacting them with low molecular weight materials using an extruder to carry out mixing of the components are known. U.S. Pat. No. 5,376,734 (Al Ghatta) and U.S. Pat. No. 5,334,669 (Ghisolfi) relate to processes of producing high molecular weight polyesters for castings or mouldings from polyesters with a low molecular weight by mixing with an acid or anhydride in a heated extruder and then heating the extruded mixture for a long period, such as 12 hours at 150–170° C., in an oven. The examples show that the intrinsic viscosity of the polymers is greater after passing through the extruder which indicates an overall increase in molecular weight. A similar process is disclosed by U.S. Pat. No. 4,132,707 (Borman) relating to preparing a branched PET with high melt viscosity for plastic mouldings by reacting a polyester having a low melt viscosity with a branching component such as pentaerythritol by mixing the components in an extruder, pellitizing the extrudate and then heating it at around 200° C. for about 7 hours in an oven. Another similar process is disclosed in EP 442 282 (Phobos) which is concerned with making high molecular weight polyesters for mouldings or yarn, from low molecular weight polyesters, particularly from recycled PET, by reaction with a dianhydride involving mixing the polymer and dianhydride in an extruder, pellitizing the extrudate and then heating at about 200° C. for about 5 hours. The examples show that intrinsic viscosity of the polymers is greater after passing through the extruder which indicates an overall increase in molecular weight.

Further problems encountered in the art also relate to the preparation of functionalized polymers. It is not generally possible to make these (i.e. polymeric units with functional end groups, which are for example capable of cross-linking) by building a polymer from a mixture of suitable functional monomers and structural monomers because they are randomly dispersed along the chain. They also have a tendency to form branched polymers, which have unacceptably high viscosity for use in coating compositions.

It is also possible that functionalized polymers containing cleavable groups such as ester groups can be hydrolysed to form smaller molecular weight fragments, but in such instances the residual functional group on the cleaved polymer is a hydroxy. Previous techniques which have carried out this reaction and not quenched it have produced an equilibrium polymer composition which contain relatively low levels of the relatively unreactive hydroxy group (i.e. typically only one group on the end of each polymer chain). By the process of the invention, large polymers can be cleaved to form smaller polymers with a higher level of reactivity, by the introduction of either a more reactive functional group, or the introduction of more than one functional group on to the end of each functionalized polymer.

It has been found that it is possible to use a combination of suitable processing techniques, organic polymers, and chemical species to provide modified polymers which have enhanced levels of potential reactivity; that is, they have been functionalized. Such processes and modified polymers have been found to be particularly suitable for use in the manufacture of coating compositions. Polymers which are suitable for use in the method are those which have a cleavable group in their backbone, with particularly preferred polymers being those which have an activated carbonyl group in the backbone. In this context, an activated carbonyl group is one which has at least one adjacent electronegative atom. Preferred species of activated carbonyl groups have adjacent oxygen or nitrogen atoms.

Polymers which have activated carbonyl groups in their back bone chain possess a desirable combination of properties which make them ideal for coating applications. Preferred examples of polymers which have activated carbonyl groups in their back bone are polyesters, polyurethanes, polyureas, polycarbonates, and polyamides.

Thus, according to a first aspect of the invention, there is provided a process for preparing a thermosetting, crosslinkable protective coating composition containing an organic functionalized polymer having functional groups adapted to crosslink upon heating, the process comprising;

(a) providing a reaction mixture of
  (i) a cleavable carbonyl polymer having a cleavable unit containing an activated carbonyl group adjacent to an oxygen or a nitrogen atom, the activated carbonyl group being in the polymer backbone, the cleavable polymer having a weight average molecular weight of greater than 5,000, and heated above its softening point in the reaction mixture
  (ii) a multifunctional compound having a weight average molecular weight of less than 5,000, the multifunctional compound having at least one functionally reactive group capable of reacting with the cleavable carbonyl polymer to cleave the polymer at the activated carbonyl group and form a bond with the cleaved polymer, the multifunctional compound having at least one functionally active crosslinking group;

(b) reacting the reaction mixture while intimately mixed in an extruder under conditions of shear, at a temperature between about 50 and 350° C. for a reaction time period between about 15 and 600 seconds, to cleave the polymer at the carbonyl group to produce a cleaved polymer, and to react the cleaved polymer with the functionally reactive group on the multifunctional compound to form a bond between the multifunctional compound and the cleaved polymer (c) quenching the reaction mixture after the reaction time by rapid cooling of the reaction mixture prior to equilibrium reaction and crosslinking of the reaction mixture, to produce a functionalized polymer of cleaved polymer and multifunctional compound, the functionalized polymer having functionally active crosslinking groups derived from the multifunctional compound and capable of crosslinking by heat reaction outside the extruder, (d) producing a heat reactive protective coating containing the functionalized polymer as a thermosetting polymeric binder, where the functionally active crosslinking groups are adapted to heat crosslink and react with a crosslinking agent, or with other functional coreactive groups in the functionalized polymer or cleaved polymer, to produce a thermosetting coating composition By "quenching" the reaction in the context of the invention is meant that the reaction is not allowed to reach what would be its normal equilibrium point at that temperature. A particularly good way of achieving this is to conduct the process on a continuous basis (i.e. not on a batchwise basis), such that the reactants are heated and thereby reacted in one part of the apparatus, but then quickly passed to another part of the apparatus where they are cooled, and further reaction is prevented. In practice it has been found that such control of the reaction and its equilibrium position is not so readily possible if the process is carried out in a batchwise process, such as in a heated batch reactor. The use of an extruder allows the operator to heat and mix rapidly the ingredients of a reaction and therefore to initiate it, but then to cool rapidly the reaction ingredients, thereby quenching it and preventing it from reaching its normal equilibrium.

Quenching is crucial to the process. If the cleavable polymer and the multifunctional compound are reacted together to equilibrium, then high molecular weight products of relatively low functionality result. These high molecular weight products are markedly inferior, when used in coatings, to the products according to the present invention in terms of viscosity and flow-out and in terms of crosslinking ability.

Without being bound by this theory, what appears to happen is that the average molecular weight of the polymer in the reaction mixture initially drops and then rises again with time. Initially, reaction of the polymer and the multifunctional compound is kinetically preferred, because of the relatively small size of the multifunctional compound, and the average molecular weight of the polymer components drops as the reaction proceeds and polymer is cleaved.

However, the cleaving of the cleavable polymer by the multifunctional compound results in polymer fragments which are themselves reactive. Thus, as well as cleaving, there are also competing reactions between the polymeric components, i.e. between cleaved polymer fragments, between uncleaved polymer fragments and between these two species. These competing reactions tend to raise the molecular weight. These competing reactions are thermodynamically preferred and the final reaction product at thermodynamic equilibrium is a polymer which is equal or higher in molecular weight than the initial cleavable polymer.

As the reaction proceeds and the multifunctional compound is used up, the balance shifts from the kinetically favoured cleaving reaction to the thermodynamically favoured inter-polymer reactions and so the average molecular weight goes through a minimum and rises again towards equilibrium. The importance of quenching is to freeze the reaction somewhere in the lower molecular weight region so as to obtain polymers useful for coating compositions.

According to another aspect of the invention, there is provided a thermosetting, crosslinkable protective coating composition containing an organic functionalized polymer having functional groups adapted to crosslink upon heating, the functionalized polymer comprising the reaction product of;

(i) a cleavable carbonyl polymer having a cleavable unit containing an activated carbonyl group adjacent to an oxygen or a nitrogen atom, the activated carbonyl group being in the polymer backbone, the cleavable polymer having a weight average molecular weight of greater than 5,000, and heated above its softening point in the reaction mixture, (ii) a multifunctional compound having a weight average molecular weight of less than 5,000, the multifunctional compound having at least one functionally reactive group capable of reacting with the cleavable carbonyl polymer to cleave the polymer at the activated carbonyl group and form a bond with the cleaved polymer, the multifunctional compound having at least one functionally active crosslinking group;

in which the functionalized polymer is made by a process in which (i) components (a) and (b) are coreacted while intimately mixed in an extruder under conditions of shear, at a temperature between about 50 and 350° C. for a reaction time period between about 15 and 600 seconds, to cleave the polymer at the carbonyl group to produce a cleaved polymer, and to react the cleaved polymer with the functionally reactive group on the multifunctional compound to form a bond between the multifunctional compound and the cleaved polymer and then (ii) the reaction mixture is quenched after the reaction time by rapid cooling of the reaction mixture prior to equilibrium reaction and crosslinking of the reaction mixture, to produce a functionalized polymer of cleaved polymer and multifunctional compound, the functionalized polymer having functionally active crosslinking groups derived from the multifunctional compound and capable of crosslinking by heat reaction outside the extruder, to produce a heat reactive protective coating containing the functionalized polymer as a thermosetting polymeric binder, where the functionally active crosslinking groups are adapted to heat crosslink and react with a crosslinking agent, or with other functional coreactive groups in the functionalized polymer or cleaved polymer, to produce a thermosetting coating composition.

Multifunctional compounds for use in the process and composition according to the invention are those in which, in addition to the functionally active group which reacts with the cleavable group in the polymer, have at least one other functionally active crosslinking group. If the functional group is hydroxy, it is preferred that the multifunctional compound contains at least two other functionally active groups.

Conveniently the low molecular weight compound is an organic compound.

Examples of cleavable polymers are polyester, polyamide, polyurea, polyurethane, or polycarbonate. Preferably the cleavable polymer is a polyester, polyurethane or polycarbonate, and in particular a polyester.

In a highly preferred form of the invention, a method of providing a polymer dispersion is provided by further dispersing the polymer produced by this process into a liquid medium. This can conveniently be done in an extruder by introducing liquid media into the extruder during the extrusion process.

In the context of the invention, a functional polymer is one which has been "modified" to be reactive—i.e. it will be capable of being cross-linked, either with a cross-linking agent, or a similar reactive molecule. Where the modified polymer composition is used as a surface coating and no additional cross-linking agent is present, this means that the coating composition has the potential of self curing.

With regard to the lower molecular weight species in the composition, namely the multifunctional compound, oligomer or polymer, the terms molecular weight and weight average of molecular weight are synonymous, but it is more correct to refer to molecular weight in the context of organic compounds, and weight average molecular weight in the context of oligomers and polymers.

According to a further aspect of the invention, there is provided a modified polymer comprising the reaction product of a polymeric component having a weight average molecular weight of greater than 5,000, the polymeric component comprising a polymer having a carbonyl group in its backbone, together with a second component comprising a multi functional compound, oligomer or polymer having a molecular weight or weight average of molecular weight of less than 5,000 and comprising at least two functional groups, the two components reacting under shear at a temperature of 50–350° C., wherein the polymer is cleaved and the reaction is quenched.

Preferably, the reaction temperature in the extruder is in the region 150–300° C.

Preferably, the polymer having a carbonyl group in its backbone is a polyester, polyamide, polyurea, polyurethane, or polycarbonate, more preferably a polyester, polyamide, polyurethane or polycarbonate, and in particular a polyester.

Likewise, a preferred form of this aspect of the invention is a polymer dispersion provided by dispersing the polymer so produced, conveniently in an extrusion step, in a liquid vehicle. Conveniently, such a polymer is prepared at elevated temperature and pressure in the extruder. One of the benefits of the process is that it is possible use the polymers in the form of relatively small, uniform spherical particles, especially when the intended use is as a fusion coating to be applied in powder form.

The reaction of the present invention is carried out in an extruder, preferably in a continuous twin-screw extruder. The multi-functional organic compound, oligomer or polymer has a molecular weight or weight average molecular weight of less than 5000, more preferably less than 2,000, more preferably less than 500, and conveniently in the region between 50 and 500.

The multi-functional organic compound, polymer or oligomer has at least two, and preferably three or more functional groups. The functional groups may be selected from, though are not limited to; hydroxy, carboxy, amino, thio, epoxy and phenolic, silane or any combination of these groups. Where the functional groups contain hydroxy groups, it is preferable that there are at least three functional groups.

Examples of useful multi-functional low molecular weight organic compounds or oligomers having hydroxy groups are: pentaerythritol, trimethylol propane, glycerol, ethylene glycol, N,N,N$^1$,N$^1$-tetra bis(2-hydroxy propyl) ethylenediamine, oligomers containing 2-hydroxy ethyl acrylate and other hydroxy containing acrylates or methacrylates.

Examples of useful multi-functional low molecular weight organic compounds or oligomers having thio groups are: 3-mercapto-1,2-propanediol and mercaptosuccinic acid.

Examples of useful multi-functional low molecular weight organic compounds or oligomers having carboxy groups are: ethylenediaminetetraacetic acid, 1,2,3 benzene tricarboxylic acid, 1,2,4,5-benzene tetracarboxylic acid, 1,2, 3-propane tricarboxylic acid and the salts of these acids and oligomers containing acrylic or meth-acrylic acids.

Examples of useful multi-functional oligomers having amino groups are: diethylenetriamine, triethylenetetramine and tris(2-aminoethyl) amine.

Examples of useful oligomers having two or more functional groups which are different are: citric acid, lactic acid, glutamic acid, tris (hydroxymethyl) amino methane, 2-amino-2 ethyl, 1,3 propanediol, amino-acids such as 5-amino isophthalic acid, maleic and itaconic acids or their anhydrides, and N-[3-(trimethoxy silyl) propyl] ethylene diamine, and 3-aminopropyl (trimethoxy) silane.

Where the low weight average molecular weight species is a polymer containing a high degree of functionality, it is preferred that the polymer is a low molecular weight polyester, in particular one which is rich in either hydroxy or carboxy groups.

The high weight average molecular weight polymer for use according to the invention preferably has a weight average of molecular weight of greater than 5,000, more preferably greater than 10,000, and preferably less than 300,000.

This polymer is one which contains a carbonyl group in its backbone, examples of which include polyesters, polyamides, polycarbonates, polyureas, or thermoplastic polyurethanes. The preparation of polyesters, polycarbonates and nylons is described in the 3rd Edition of Kirk-Othmers "Encyclopaedia of Chemical Technology" published by J. Wiley & Sons of NY in 1982, see Vol. 18, pages 549–574, pages 479–494, pages 406 to 426.

Examples of useful polyesters are: polyethylene terephthalate (PET), polybutylene terephthalate (PBT), co-polymers of ethylene glycol and a mixture of terephthalic and isophthalic acids (PET/I) and polyethylene naphthenate (PEN). Other examples of useful polyester copolymers include elastomeric polyesters having segments of a low glass transition temperature such as polyester-polyether block copolymers some of which are commercially available from E. I. Dupont de Nemours & Co. under the Trade Mark HYTREL.

Examples of useful polyamides are: nylon 6,6, nylon 6, nylon 4,6, nylon 11 and aromatic nylons which are polyamides comprising condensates of aromatic diamines such as 1,3-di (amino methyl) benzene.

Examples of useful polycarbonates are: 2,2-bis(4 hydroxy phenol) propane (Bisphenol A) polycarbonate, commercially available from Enichem Spa of Italy under the Trade Mark SINVET.

The preparation of polyureas can be found in the Encyclopaedia of Polymer and Science and Engineering (2nd Edition), Vol. 13, pages 212–243, edited by Mark, Bikales, Overberger and Menges, published by John Wiley & Sons (1988). The preparation of thermoplastic polyurethanes is described in the same book on pages 279–294.

It has been found that polymer compositions provided according to the invention, which involve a chemical reaction in an extruder between a cleavable polymer for example having an activated carbonyl group in its backbone, and a low molecular weight compound, oligomer or polymer, have been found to have unusual and beneficial properties.

Without wishing to be bound by theory, it is suspected that these properties are due to both the nature of the chemical reaction undergone between the preformed cleavable polymer and the reactive organic compound, oligomer or polymer, and the physical environment necessary to provide the quenched, non-equilibrium reaction products, which can conveniently be generated in the extruder. With regard to the physical environment, processing apparatuses such as an extruder are able to subject the materials being processed to very rapid and intimate heating, cooling and mixing, and this it is believed affects the reaction equilibrium to provide reaction products that are different to those provided in a non-extruder, equilibrium environment. This effect can be exaggerated if the passage time of the reactants in the area of the extruder where reaction occurs (i.e. the higher temperature part of the apparatus) is kept relatively short, i.e. in the region of 15–600 seconds.

Another factor contributing to the unusual polymer compositions produced according to the invention is the nature of the chemical reaction involved. In particular, for the carbonyl containing polymers described above, where there is an activated carbonyl group in the backbone of the polymer, and especially where there is an oxygen or nitrogen atom adjacent this carbonyl group, there has been found a tendency for the low weight reactive compound, polymer or oligomer to produce a cleavage reaction in the polymer, producing at least an initial reduction in the average weight molecular weight of the polymer species present. In addition, the reduced weight species so produced tend to have a very high proportion of chains having chain end groups which are reactive, the exact nature of which will depend on the nature of the functional groups on the low molecular weight reactive species, but which for example may be hydroxy, amino or carboxy groups.

The following reaction is representative of the process of the invention, where under extrusion conditions polyethylene terephthalate (PET), a high molecular weight polymer, can be cleaved by pentaerythritol to provide a lower molecular weight polymer which has increased functionality on the end groups, and is therefore more susceptible to cross-linking:

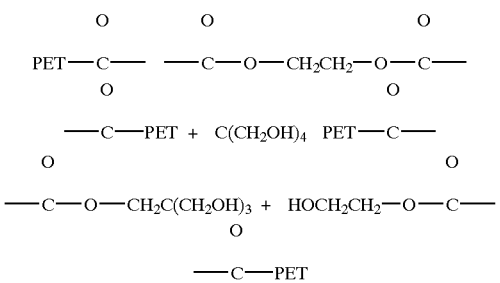

Polymer compositions and dispersions having such a relatively low weight average molecular weight and a high degree of chain end functionality have been found to be particularly suitable for use in coating compositions such as paints and coatings, in which their relatively low weight average of molecular weight means that the composition has a relatively low viscosity and therefore flows well, and provides an even coating. The high degree of end of chain reactivity also makes the polymers particularly suitable for combination with other compounds commonly found in coating compositions, such as isocyanates, with which they can readily cross-link on application and form superior quality coatings.

The extent of the reaction between the particular species of high molecular weight polymer and the multifunctional compound, oligomer or polymer can thus be followed in an extruder by measuring the viscosity of the polymer composition at a given time and after a certain amount of processing time in the extruder, and also the cure properties of composition so produced. The latter can be evaluated using a solvent resistance test involving rubbing the coated surface with a cloth containing methyl ethyl ketone (MEK), and measuring the resistance to the solvent. This test is a standard one used in the industry for evaluating solvent resistance.

The activated carbonyl containing polymer is partially reacted with the multi-functional low molecular weight compound, oligomer or polymer. The functional groups on the compound, oligomer or polymer may be less than 75% reacted with the carbonyl containing polymer, preferably less than 50% reacted. In practice it has been found to be preferred that the multifunctional compound, oligomer or polymer has several end functional groups which are reactive, but that it has preferably used only one of these to react with the higher molecular weight polymer species. This means that the remainder of the end functional groups are available for crosslinking, and it is this feature that, when the modified polymer so produced is used as a coating composition, can provide the composition with its self curing properties, or an enhanced degree of cross-linking with the curing agent.

The degree of reaction between the polymer and the low molecular weight compound, oligomer or polymer may also be determined by measuring the molecular weight of the blend. The molecular weights disclosed herein are determined by a Knauer high temperature gel permeation chromatograph fitted with a refractive index detector, and using ortho chlorophenol at 120° C. as the eluent. The columns were Shodex AT 80 m/s, and were calibrated using a polystyrene standard.

The degree of reaction between the polymer and the low molecular weight compound, oligomer or polymer may be determined by measuring the viscosity of the blend. The viscosities disclosed herein are measured on a Carrimed CLS 100 rheometer (TA Instruments) at a given temperature and shear rate. The viscosity at a given temperature initially decreases as a function of the extent of reaction between the two components.

The ratios between the higher molecular weight carbonyl containing polymer and the multifunctional compound, oligomer or polymer in the composition may vary widely, but will roughly be related to the molecular weight or weight average of molecular weight of the species used. In particular, it is preferred that when the activated carbonyl containing higher molecular weight polymer is cleaved by the multifunctional compound, it is cleaved to units which have a weight average of molecular weight in the region 1,000–100,000. Over the possible molecular weight ranges of the activated carbonyl containing polymer and the multifunctional compound, this can lead to mole ratios of the two in the region of 10:1 to 1:300 to provide utilisable compositions.

However, there will be a tendency for the mole ratios of higher molecular weight polymer to multifunctional compound to be much narrower, for example in the region 1:3 to 1:300, when the average weight of molecular weight is relatively higher, for example over about 300,000. In addition, when the multifunctional organic compound, oligomer or polymer has a relatively high molecular weight (ie approaching 5,000), there may be a tendency for the mole ratio of higher molecular weight polymer to multifunctional compound to be relatively high, for example in the region 10:1 to 1:5, especially where the weight average of molecular weight of the higher molecular weight polymer is nearer the lower end of the scale, for example in the region of 5,000.

A catalyst may be added to the reaction. Examples of suitable catalysts are those based upon tin (such as the Fascat range available from Atochem UK Ltd.), or titanium (such as the Tilcom range available from Tioxide Chemicals).

It would not be possible to form the novel compositions of the present invention by the conventional batch reactor route because the necessarily long reaction times would favour complete reaction between the high weight polymer and the compound, oligomer or low molecular weight polymer which would result in highly branched polymers or gels, or would result in much lower molecular weight polymers. The present process conditions enable novel polymers to be formed which possess a combination of thermoplastic and thermosetting properties, with the effect that the polymers possess better flow characteristics and other desirable properties such as the ability in compositions to provide enhanced crosslinking.

By thermoplastic in the context of the invention is meant a polymer which can be melted by heat and cooled, the process being able to be repeated a number of times without appreciable change in properties. Thermoplastic polymers are also normally attributed with good flexibility. However the polymers of this invention only exhibit thermoplastic behaviour up to a point; if melted and cooled an excessive number of times, or are heated to an excessive degree, an irreversible chemical change occurs in the polymer. This, and the good chemical resistance the polymers have, are both considered to be thermosetting properties.

The modified polymer of the present invention may be in the form of an extrudate, a dispersion in an aqueous or non-aqueous continuous diluent, or in the form of a powder. When the composition is in the form of a dispersion, it can be utilised directly, optionally with the addition of suitable additives, or it can be treated so as to isolate the polymer as a solid. This can optionally be powdered, and this powder can itself be used directly, or redissolved or redispersed in a liquid, both again optionally with suitable additives.

If the extruded composition is in the form of a melt which has been allowed to solidify, then this extrudate can optionally be dried and ground into a powder, or redissolved or redispersed in a liquid, both again optionally with suitable additives. In a preferred embodiment, the composition comprises solid particles of the modified polymer dispersed in a diluent.

The size of the droplets or particles of the modified polymer may range from 0.1 to 80 $\mu$m. For liquid coating applications the preferred range is 0.1 to 20 $\mu$m and for powder coating applications the preferred range is 2–50 $\mu$m.

When in dispersed form, the modified polymer preferably comprises at least 15% by weight of the dispersion, more preferably from 20 to 80% by weight of the dispersion and most preferably from 30 to 70% by weight of the dispersion.

The process for producing the polymer dispersion according to the invention further includes dispersing the modified polymer in an aqueous or non aqueous medium. When the reaction is carried out in an extruder, preferably the modified polymer is dispersed using the extruder, and most preferably the chemical modification and dispersion processes are carried out by a single pass through the extruder. The process of manufacturing the polymer itself may also include the step of drying the dispersion after extrusion to form the modified polymer in substantially spherical powder form. It is also advantageous to wash the dried dispersion, for example to remove traces that may be present of processing aids, such as dispersants.

The reaction according to the invention is conveniently carried out in an extruder. An example of such an extruder is the Leistritz co-rotating micro-18 GL 40D.

The temperatures set inside the extruder depend on the type of polymer used and whether the polymer is to be dispersed in water or a non-aqueous medium. The temperatures may range from 50° C. to 250° C. for aqueous dispersions and from 50° C. to 350° C. for non-aqueous dispersions. The process is preferably carried out at a pressure of from 1 to 100 bar.

An advantage of certain coating compositions and the method according to the invention is that it may be possible to apply the coating to a substrate in a composition which contains no curing agent, and to subsequently bake the coating, for example in an oven, and to obtain a surprisingly high degree of self-cross linking in the coating film.

In a basic embodiment, the polymer is metered in the form of granules into the intake of the feed zone and is melted at a temperature above the melting point or the softening point of the polymer, preferably from 5 to 200° C. above the softening point of the polymer. The melt is blended by means of rotating screws. Solid multi-functional components are most advantageously metered together with the polymer into the intake of the feed zone. In the extruder, the melt/blend zone is followed by a pre-inversion zone. There the desired amount of a dispersant mixed in a small amount of water or non-aqueous solvent is pumped in, and droplets of water or non-aqueous solvent form in the melt continuous phase.

This pre-inversion zone is followed by a post-inversion zone into which a predetermined amount of water or non-aqueous solvent respectively is added. Phase inversion in this zone results in the formation of an aqueous or non-aqueous dispersion in which the water or non-aqueous medium forms a continuous phase and the modified polymer, together with any unreacted components, form a dispersed phase of particles. Alternatively a non phase inversion route may be used in which sufficient liquid is pumped (along with dispersant) into the extruder to generate a dispersion of the modified polymer together with any unreacted components directly without undergoing phase inversion.

As an alternative to adding the activated carbonyl containing polymer in the pre-formed state, it may instead be formed in the extruder itself. In this case, there will be a further zone in which polymerisation takes place prior to extrusion of the polymer into the melt/blend zone to which the oligomer or low molecular weight organic compound is added. This dispenses with re-melting of the polymer, saves energy and avoids additional thermal stress on the polymer. The continuous liquid phase can comprise any aqueous or non-aqueous medium which, where the product is a dispersion, is immiscible with the modified polymer. Examples of suitable non-aqueous media are hydrocarbons such as aliphatic C10–20 hydrocarbons. The continuous liquid phase may also be a reactive diluent; that is, it can be a liquid which can cross link or cure with other polymers or cross linkers in the solution or dispersion. Examples of reactive diluents are liquid epoxy resins, such as for example Epikote 880, ex. Shell.

The size of the droplets or particles of the modified polymer in the liquid medium depends on a number of factors. The viscosity of the melt at the temperature at which the dispersion step is carried out, the viscosity of the continuous phase, the degree of shear and the quantity of dispersant used all affect the particle size. The viscosity of the melt will depend on the extent to which the polymer has been reacted with the oligomer. In general, the longer the reaction time and/or the higher the temperature in the melt/blend zone the lower the molecular weight of the polymer will become which in turn leads to a lower melt viscosity. Thus, lower melt viscosity, a greater degree of mixing and/or a larger quantity of dispersant will give rise to smaller droplets or particles.

The dispersant helps to emulsify the polymer melt, and stabilises the dispersed particles or droplets of the modified polymer in the liquid medium so as to prevent flocculation of the particles or droplets and facilitate the formation of the dispersion.

The dispersant may be a block or graft copolymer comprising a first component which is soluble in the liquid medium and a second anchor component which is reacted with or associated with the modified polymer.

The nature of the first component depends on the identity of the continuous liquid medium. Thus, when the liquid medium is an aliphatic-hydrocarbon, then the first component can be a hydrocarbon chain such as a polybutadiene chain.

The second component can be one which reacts with, associates with or physically adsorbs onto the modified polymer.

Examples of suitable components which associate with the polymer phase are polar acrylate and methacrylate polymers, and vinyl pyrrolidine polymers. Examples of suitable components which can react with the modified polymer are acid group containing moieties, and anhydride groups or epoxy containing groups. These types of dispersants are well known in the art.

Other ingredients such as heat and light stabilizers and pigments can also be added. Such ingredients can be incorporated as an additive to the melt or can be an ingredient of the polymer. When the additive is a pigment it is advantageous to introduce the additive into one of the reactants prior to or during the polymerisation reaction.

A typical example of a process carried out in a twin-screw extruder (Leistritz type Micro-18 GL 40D) in which the screws rotate in the same direction is given below:

A polymer in the form of solid pellets and having a melting point of between 80–300° C. is added to the feed inlet of an extruder at between 1 and 4 kg/hr, together with 0.05 to 15% by weight of a multi-functional organic compound, oligomer or polymer. The temperature in the melt/blend zone is maintained at between 150 to 280° C., depending on the actual system. Two co-rotating 18 mm diameter screws are rotated in the same direction so as to transfer the melt to an adjacent pre-inversion zone which is maintained at a temperature of between 100 and 250° C., again with the actual temperature being dependent on the specific system. Here an oil solution containing 10–50% by weight of a suitable dispersant is added at between 1 and 4 kg/hr. The oil forms droplets in the melt continuous phase due to the shear caused by the co-rotating screws.

The dispersion is then transferred from the pre-inversion zone to an adjacent final zone where oil is pumped in at between 1 and 4 kg/hr. This is the post-inversion zone where phase inversion occurs so that the polymer melt is now in the form of droplets in the oil continuous phase. The temperature in this zone is maintained at between 100° C. and 200° C. The resultant dispersion has a non-volatile solids content of between 30 and 65%, though the resulting dispersions from the general method can have a concentration of 5–80%, preferably 30–65% by weight. The size of the resultant primary polymer particles is around 0.1–100 μm, preferably 2 to 30 μm. The mean residence time in the extruder is 0.5–5 minutes.

The resultant particles may be used in coating applications either in the dispersed form or in the form of a powder where the particles have been isolated from the liquid medium. The liquid medium may be removed by conventional techniques such as by extracting the particles and evaporating off the remaining solvent in an oven. Isolated particles may if desired be re-dispersed in another liquid carrier.

The present invention also relates to a composition containing the modified polymer described herein as the main film forming component, optionally with a liquid diluent.

The composition can also comprise other conventional components such as pigments, crosslinkers, fillers, thickeners biocides, UV stabilisers, curing agents, catalysts, surfactants, dispersants, solvents, and other film forming polymers.

The present invention also relates to a process of coating a substrate using the coating composition comprising the steps of (a) applying a layer of a curable composition as herein described to the surface of a substrate, and (b) allowing or causing the layer to cure.

The curable composition can be applied to a substrate by conventional means such as brushing, roller coating, spraying or dipping. Suitable substrates include, but are not limited to, metals such as steel, aluminium and tin and non metals such as masonry, wood, plastic and glass. The layer can be cured by allowing the liquid phase to evaporate at room temperature or by heating, for example from 50 to 250° C. for 0.3–30 minutes. Alternatively, the layers can be applied as a dried powder and heated to cure.

The present invention also relates to a coated substrate having adhered thereto a coating according to the above composition.

The following Examples illustrate various embodiments of the present invention:

EXAMPLE 1

A twin-screw extruder in which the screws rotate in the same direction (Leistritz type micro 18 GL 40D) was used.

2 kg/hr of polyethylene terephthalate/isophthalate (PET/I) in the form of pellets with a weight ratio of 82 parts by weight of terephthalic acid to 18 parts by weight of isophthalic acid and having a melting point of 209° C. and an intrinsic viscosity of 0.63 dL/g in orthochlorophenol at 25° C. was metered together with 2–40 g/hr of pentaerythritol (Pe) into the intake of the feed zone of the extruder and melted and blended at 280° C. Downstream of the melt/blend zone 1 kg/hr of 30% polybutadiene/methyl methacrylate/methacrylic acid graft copolymer dispersant in isohexadecane was pumped in. In this pre-inversion zone the temperature was maintained at 250° C. and droplets of the dispersant mixture were formed in the melt/blend continuous phase. In another zone further downstream 1.7 kg/hr of isohexadecane was pumped in to cause phase inversion whereby droplets of the melt were formed in the isohexadecane. The temperature in this post-inversion zone was maintained at 180° C. The resulting dispersion had a non-volatile solids content of 49%.

The effect of using different amounts of pentaerythritol (Pe) and a Fascat 4101 catalyst (available from Atochem UK Ltd) on viscosity, molecular weight and average particle size of the final polymer is given in the Table below:

| Polymer | Viscosity* (240° C.) Poise | Molecular Weight MW | Average particle size (μm) |
|---|---|---|---|
| PETI | 1060 | 72400 | 4.14 |
| PETI = 0.1% Pe | 780 | 49200 | 3.54 |
| PETI = 0.5% Pe | 130 | 40800 | 2.9 |
| PETI = 0.1% Pe + catalyst (0.2%) | 62 | 23000 | >50.00 |

*Shear rate = $20s^{-1}$

EXAMPLES 2–11

Examples 2–11 were carried out in a Leistritz type micro 18GL 40D extruder. This extruder has a main feed channel and two subsequent fluid injection ports, with the regions after each inlet being $T_1$, $T_2$, $T_3$, respectively. Each of the regions $T_1$–$T_3$ is separately sustainable at a different temperature.

During the extrusion procedure, the modified polymer of the extrusion process can be extruded directly as a polymer. Alternatively one or more additional solvents, and optionally other additives, can be injected into the processing polymer through the fluid injection ports as it is being processed by the extruder, to produce at the extruder exit a polymer dispersion. In the examples which follow, all amounts are parts by weight. In addition, where viscosities are quoted, these are of the melt extrudates, and have been measured at 240° C. and 20 sec$^{-1}$.

EXAMPLE 2

| Composition | Component PET (1) | Epikote 1004 (2) | Fascat 4101 (3) | Pentaerythritol (4) |
|---|---|---|---|---|
| A | 50 | 50 | 0.2 | — |
| B | 50 | 50 | 0.2 | 1 |

(1) polyethylene terephthalate, ex. ICI Chemicals & Polymers
(2) ex. Shell, an epoxy functional resin
(3) A tin based catalyst, ex. Atochem, which promotes transesterification.
(4) ex. Degussa In the extruder, the temperatures in the operating zones were $T_1$=260° C., $T_2$=250° C., $T_3$=200° C. In this example, once processed by the extruder, the extrudates were heated in the presence of 1-methoxy-2-propanol acetate (30% solids) to 160° C. This composition was agitated by means of a Silverson homogeniser for 3 minutes, and then allowed to cool to room temperature. The compositions were then applied to aluminium panels, subjected to the cure schedule and stoved.

| | Results | |
|---|---|---|
| Composition | Cure Schedule | MEK Rubs |
| A | 240° C/10 mins | 50 |
| C | " | 100 |

The above results show dramatic improvement in the solvent resistance of the coating as measured by the MEK rub test when the polymer is extruded in the presence of the multi functional compound pentaerythritol.

EXAMPLE 3

| Composition | PETI(5) | Fascat 4101(3) | Pentaery-thritol(4) | Zone Temp (° C.) | | |
|---|---|---|---|---|---|---|
| | | | | $T^1$ | $T^2$ | $T^3$ |
| A | 100 | — | — | 260 | 260 | 200 |
| B | 100 | 0.05 | — | " | " | " |
| C | 100 | 0.05 | 0.05 | " | " | " |
| D | 100 | — | — | " | " | " |
| E | 100 | 0.05 | — | " | " | " |
| F | 100 | 0.05 | 0.5 | " | " | " |
| G | 100 | 0.2 | 0.1 | " | " | " |
| H | 100 | — | 0.1 | " | " | " |

(5)B80 Polyethylene terephthalate/isophthalate containing 18% by weight isophthalate, a polyester polymer, ex. ICI Films.

In example 3, the extrudate was in the form of a non-aqueous dispersion, where a 30% solution of a dispersant based on methyl methacrylate and methacrylic acid grafted onto polybutadiene (produced as described in EP-B-321,088) in isohexadecane (ex. Bayer) is injected into the extruder via the first injection port, and isohexadecane is injected via the second injection port. The non-aqueous dispersion produced by the extruder is formulated with a cure agent and applied onto aluminium panels. It is then subjected to the cure schedule, and its solvent resistance measured via the MEK rub test.

Results

| Composition | Viscosity (poise) | Cure Agent | Cure Schedule | MEK rubs |
|---|---|---|---|---|
| A | 1060 | Cymel 350(6) | 240° C./20 sec. | 20 |
| B | 149 | Cymel 350(6) | 240° C./20 sec. | 50 |
| C | 59 | Cymel 350(6) | 240° C./20 sec. | 90 |
| D | 1060 | Desmodur N3400(7) | 240° C./3 mins | 25 |
| E | 149 | Desmodur N3400(7) | 240° C./3 mins | 18 |
| F | 59 | Desmodur N3400(7) | 240° C./3 mins | 100 |
| G | 62 | Desmodur N3400(7) | 240° C./3 mins | 100 |
| H | 780 | Desmodur N3400(7) | 240° C./3 mins | 28 |

(6)at a level of 10% based on the weight of PETI, ex Dyno Cyanamid
(7)isocyanate crosslinker, at a level of 30% based on the weight of PETI, ex-Bayer.

These results show the effect of the presence of the multifunctional organic compound in the extrusion process. In particular in 3A–C, the presence of 0.5 parts pentaeryitirol in the mixture results in a dramatic reduction in viscosity of the polymer as processed by the extruder, as well as an improvement in the solvent resistance of the coating, as measured by the MEK rub test. With regard to examples 3D–H, the presence of pentaerythritol likewise leads to reduction in viscosity of the processed polymer, and an improvement in solvent rubs. A comparison of examples 3B and 3C, and also 3G and 3H implies the presence of the catalyst may be beneficial to the process.

EXAMPLE 4

| Component | PETI (5) | HMPA (8) | EDTA (9) | TRIS (10) | HA (11) |
|---|---|---|---|---|---|
| A | 100 | — | — | — | — |
| B | 95 | 5 | — | — | — |
| C | 95 | — | 5 | — | — |
| D | 98 | — | — | 2 | — |
| E | 95 | — | — | — | 5 |

(8)2,2 bis (hydroxy methyl) propionic acid, ex. Aldrich
(9)Ethylene diamine tetraacetic acid disodium salt, ex Aldrich
(10)Tris (hydroxy methyl) amino methane, ex Aldrich
(11)Hydroxy acrylic resin, styrene/butyl acrylate/hydroxy butyl acrylate/methacrylic acid, weight ratios 24.1:41.2:29.8:4.9, made by solution polymerisation at 80% solids in MIBK, acid value 32 mg KOH/g resin, OH value 116 mg KOH/g resin, $T_g$ $-20°$ C., and $M_w$ = 4,410.

In example 4, 4A–E were in the form of a non-aqueous dispersion, produced in the same manner as described in Example 3. The dispersion is again formulated with a curing agent, and applied onto aluminium panels. In all cases, the zone temperatures were $T_1$ = 270° C., $T_2$ = 250° C., and $T_3$ = 250° C. It is then subjected to the cure schedule, and its solvent resistance measured by the MEK rub test.

Results

| Composition | Viscosity (poise) | Cure Agent | Cure Schedule | MEK rubs |
|---|---|---|---|---|
| A | 1060 | Desmodur N3400(7) | 240° C./3 mins | 24 |
| B | 24 | Desmodur N3400(7) | 240° C./3 mins | 100+ |
| C | 500 | Desmodur N3400(7) | 240° C./3 mins | 100+ |
| D | 49 | Desmodur N3400(7) | 240° C./3 mins | 100+ |
| E | 343 | Desmodur N3400(7) | 240° C./3 mins | 100+ |

These results demonstrate that the benefit of process, in terms of the reduced viscosity of modified polymer and solvent resistance, are obtainable for a wide range of low molecular weight multifunctional organic compounds.

EXAMPLE 5

This example utilized a PETI polyester polymer with a different isophthalate content (50% by weight), which has a lower melting point than the 18% PETI of earlier examples. It also demonstrates the effect of the functionality of the low molecular weight organic compound. The products of the process were polymer melts. The multifunctional organic compounds were added at different weights but equal molar proportions.

| Composition | PETI (12) | Fascat 4101 (3) | Benzyl alcohol (13) | Ethylene glycol (14) | Trimethylol propane (15) | Pentaerythritol (4) |
|---|---|---|---|---|---|---|
| A | 100 | — | — | — | — | — |
| B | 99.8 | 0.2 | — | — | — | — |
| C | 99.8 | 0.2 | 0.79 | — | — | — |
| D | 99.8 | 0.2 | — | 0.45 | — | — |
| E | 99.8 | 0.2 | — | — | 0.9 | — |
| F | 99.8 | 0.2 | — | — | — | 1.0 |
| G | 100 | — | — | — | — | — |
| H | 90 | — | 7.9 | — | — | — |
| I | 90 | — | — | 4.5 | — | — |

-continued

| Composition | PETI (12) | Fascat 4101 (3) | Benzyl alcohol (13) | Ethylene glycol (14) | Trimethylol propane (15) | Pentaerythritol (4) |
|---|---|---|---|---|---|---|
| J | 90 | — | — | — | — | 10.0 |
| K | 100 | — | — | — | — | — |
| L | 100 | 0.2 | — | — | — | 10.0 |

(12) Polyethylene teraphthalate/isophthalate isophthalate, ex. ICI Films
(13) ex. Bayer
(14) ex. Aldrich
(15) ex. Bayer For all compositions the $T_1$ temperature was 260° C., $T_2$ was 250° C. and $T_3$ was 200° C.

In this example, all products were in the form of melt extrudates. All extrudates were dissolved in cyclohexane (26% nv), and Desmodur N3400 (isocyanate crosslinker) added at a level of 30% by weight of the modified PETI. The coatings were then applied, and subjected to a cure schedule before being assessed for solvent resistance.

Results

| Composition | Viscosity (poise) | Cure Schedule | MEK rubs |
|---|---|---|---|
| A | 702 | 240° C./2 mins | 3 |
| B | 2 | 240° C./2 mins | 8 |
| C | 4 | 240° C./2 mins | 13 |
| D | 9 | 240° C./2 mins | 90 |
| E | 15 | 240° C./2 mins | 120 |
| F | 11 | 240° C./2 mins | 130 |
| G | 702 | 125° C./30 mins | 2 |
| H | 7 | 125° C./30 mins | 3 |
| I | 5 | 125° C./30 mins | 5 |
| J | 25 | 125° C./30 mins | 50 |
| K | 702 | 125° C./30 mins | 5 |
| L | 2 | 125° C./30 mins | 50 |

Examples 5A–F demonstrate the increased solvent resistance that is obtainable from the modified polymer as the degree of functionality of the low molecular weight multifunctional organic compound increases. Thus, in moving from benzyl alcohol (example 5C) to pentaerythritol (example SF), the functionality of the low molecular weight organic compound increases from 1 to 4, and there is also a dramatic increase in the solvent resistance (i.e. number of solvent rubs), which is attributable to the increased reactivity of the polymer fragment.

Example G–J utilize a lower temperature cure schedule than that used for A–F, and imply that a higher temperature cure schedule is preferred. However example J using pentaerythritol clearly indicates a preference for a high degree of functionality in the low molecular organic compound. Examples K and L demonstrate a preference for the use of both a low molecular weight organic compound with a high degree of functionality, and a catalyst.

EXAMPLE 6

| Comp. | PETI (12) | Fascat 4101 (3) | Benzyl Alcohol (13) | Ethylene Glycol (14) | Trimethylol Propane (15) | Pentaerythritol (4) |
|---|---|---|---|---|---|---|
| A | 100 | — | — | — | — | — |
| B | 99.8 | 0.2 | 0.8 | — | — | — |
| C | 99.8 | 0.2 | — | 0.45 | — | — |
| D | 99.8 | 0.2 | — | — | 0.9 | — |
| E | 99.8 | 0.2 | — | — | — | 1.0 |
| F | 99.8 | 0.2 | — | — | — | — |
| G | 99.8 | 0.2 | 0.8 | — | — | — |
| H | 99.8 | 0.2 | — | 1.45 | — | — |
| I | 99.8 | 0.2 | — | — | 0.9 | — |
| J | 99.8 | 0.2 | — | — | — | 1.0 |

In example 6, 6A–J were produced in the form of non-aqueous dispersions, in the same manner as described in example 3. The dispersions were formulated with a cure agent (30% by weight of the modified polymer of Desmodur N3400 (isocyanate crosslinker, ex Bayer). In all examples, the zone temperatures were $T_1=260°$ C., $T_2=250°$ C., $T_3=200°$ C. The compositions were then applied to aluminium panels, subjected to the cure schedule, and the solvent resistance measured by the MEK rub test.

Results

| Composition | Viscosity (poise) | Cure Schedule | MEK rubs |
|---|---|---|---|
| A | 702 | 240° C./3 min | 21 |
| B | 4 | 240° C./3 min | 34 |
| C | 9 | 240° C./3 min | 45 |
| D | 15 | 240° C./3 min | 100+ |
| E | 11 | 240° C./3 min | 100+ |
| F | (not determined) | 125° C./30 min | 3 |
| G | 4 | 125° C./30 min | 10 |
| H | 9 | 125° C./30 min | 30 |
| I | 15 | 125° C./30 min | 100+ |
| J | 11 | 125° C./30 min | 100+ |

These results show that where a compound is present which is capable of cleaving the polymer in the extrusion process (i.e. examples B–E and G–J), a reduction is observed in the viscosity. However, a notable improvement in the solvent resistance is only observed when the cleaving compound is multifunctional (i.e C–E and H–J), in which case it can readily be seen that the solvent resistance improves as the functionality of the multifunctional compound increases.

EXAMPLE 7

| Comp. | Alkyd polymer (16) | Atsurf (17) | TRIS (10) | $T_1$ (° C.) | $T_2$ (° C.) | $T_3$ (° C.) |
|---|---|---|---|---|---|---|
| A | 85 | 15 | — | 250 | 90 | 80 |
| B | 85 | 15 | — | " | " | " |
| C | 85 | 15 | 2 | " | " | " |
| D | 85 | 15 | — | 250 | 180 | 80 |

-continued

| Comp. | Alkyd polymer (16) | Atsurf (17) | TRIS (10) | $T_1$ (° C.) | $T_2$ (° C.) | $T_3$ (° C.) |
|---|---|---|---|---|---|---|
| E | 85 | 15 | — | " | " | " |
| F | 85 | 15 | 2 | " | " | " |

(16)A branched polyester short oil alkyd resin, made polymerising tall oil fatty acid (33.1 pts), benzoic ac (15.7 pts), pentaerythritol (21.8 pts), phthalic anhydride (24.6 pts), in the presence of xylene (4.8 pts) to give final acid value 7.7 mg KOH/g resin, viscosity 125 poise 150° C. (ICI cone & plate viscosity), $M_n$ = 3,100 and $M_w$ = 85,40 (17)Atsurf E3969, ex. ICI Surfactants.

These examples demonstrate the utility of the method with different polymer (i.e. an alkyd polymer). Examples A–C we produced as melt extrudates. Examples D–F were produced as 40% nv aqueous dispersions, and as such were stabilised with aqueous solution of 30% polyvinyl alcohol (KL05, ex. Nipp Goshei) injected in the first inlet, and water injected at the second inlet.

The extrudates (i.e. A–C) were dissolved in Solvesso 100 Exxon Chemicals) to produce a dispersion which was 50% by weight solids, and a curing agent composition was added. The composition was then coated onto aluminium panels, subjected a cure schedule (240° C. for 3 minutes) and assessed. The aqueous dispersions had a curing composition added, coated directly onto aluminium panels, subjected to a cure schedule (240° C. for 3 minutes) and assessed.

Results

| Composition | Cure Agent | MEK rubs |
|---|---|---|
| A | Desmodur N3400 (7) | 40 |
| B | Desmodur N3400 (7) Plus 2 parts TRIS (10) | 40 |
| C | Desmodur N3400 (7) | 100 |
| D | Desmodur N3400 (7) | 40 |
| E | Desmodur N3400 (7) Plus 2 parts TRIS (10) | 30 |
| F | Desmodur N3400 (7) | 100+ |

These results demonstrate the utility of the method for other polymers (i.e. short oil alkyd resins). In addition, the results show the importance of including the low molecular weight multifunctional material (i.e. TRIS) in the extrusion process to permit polymer modification. Comparing pairs of examples B and C, and E and F, it can clearly be seen that for a film solvent resistance benefit to be observed, the multifunctional material must be present during the extrusion process. Post addition of the multifunctional material (i.e. examples B and E, where TRIS is added to the curing agent) produce no solvent resistance benefits.

EXAMPLE 8

| Composition | Dynapol L 205(18) | TRIS | Zone Temp (° C.) T1 | T2 | T3 |
|---|---|---|---|---|---|
| A | 100 | — | 260 | 220 | 200 |
| B | 100 | — | 260 | 220 | 200 |
| C | 86 | 14 | 260 | 250 | 200 |

-continued

| Composition | Dynapol L 205(18) | TRIS | Zone Temp (° C.) T1 | T2 | T3 |
|---|---|---|---|---|---|
| D | 100 | — | 260 | 250 | 200 |
| E | 86 | 14 | 260 | 250 | 200 |

(18)A saturated polyester, ex Huls 10

Example 8 demonstrates the utility of the method for a different polymer (Dynapol L205). Examples 8A–C were produced as melt extrudates whilst examples 8D–E were produced as non-aqueous dispersions, as described in example 3.

For examples 8A–C, the extrudate was dissolved in cyclohexane to produce a solution which was 30% by weight modified polymer, and a curing agent composition was added. For the non-aqueous dispersions (i.e. D and E), a curing agent composition was added directly. In all cases the compositions were then coated directly onto aluminium panels, subjected to a cure schedule (125° C. for 30 minutes) and assessed.

Results

| Composition | Viscosity (poise) | Cure Agent | MEK rubs |
|---|---|---|---|
| A | 800 | Desmodur N3400 @ 40% by weight of the polymer | 3 |
| B | 800 | Desmodur N3400 @ 40% by weight of the polymer plus 14% TRIS (10) | 4 |
| C | 5 | Desmodur N3400 @ 40% by weight of the polymer | 40 |
| D | 800 | Desmodur N3400 @ 40% by weight of the polymer | 3 |
| E | 5 | Desmodur N3400 @ 40% by weight of the polymer | 13 |

The results show the utility of the method for a further polymer and also (as in example 7) that the benefit to the composition in terms of its solvent resistance is only achieved if the low molecular weight multifunctional material is present in the extruded polymer. No benefit is observed if the same material is simply added to the curing agent composition.

EXAMPLE 9

| Composition | TPU (19) | TRIS (11) |
|---|---|---|
| A | 100 | — |
| B | 100 | — |
| C | 98 | 2 |
| D | 100 | — |
| E | 98 | 2 |

(19) Thermoplastic polyurethane grade P4470AE, ex ICI Polyurethanes.

Example 9 demonstrates the utility of the method with a different polymer species (polyurethane). Examples 9A–C were produced as melt extrudates, whilst examples 9D–E were produced as non-aqueous dispersions, as described in example 3. In all examples the temperature in the various regions was $T_1$=230° C., $T_2$=210° C., $T_3$=200° C.

For examples 9A–C, the extrudate was dissolved in cyclohexane to produce a solution which was 20% by weight modified polymer, and a curing agent composition was added. For the non-aqueous dispersions (i.e. D and E), a curing agent composition was added directly. In all cases, the compositions were then coated directly onto aluminium panels, subjected to a cure schedule (240° C. for 3 minutes) and assessed.

Results

| Composition | Viscosity (poise) | Cure Agent | MEK rubs |
|---|---|---|---|
| A | 49 | Desmodur N3400 (7) | 3 |
| B | 49 | Desmodur N3400 (7) plus 2 parts TRIS (10) | 3 |
| C | 8 | Desmodur N3400 (7) | 12 |
| D | 49 | " | 15 |
| E | 8 | " | 100+ |

As in example 8, the solvent resistance benefit is observed only if the low molecular weight multifunctional material is present in the extruded polymer and not if it is added after extrusion.

EXAMPLE 10

| Composition | Sinvet 201 (20) | TRIS (10) | Glutamic Acid (21) |
|---|---|---|---|
| A | 100 | — | — |
| B | 100 | — | — |
| C | 90 | 10 | — |
| D | 100 | — | — |
| E | 95 | — | 5 |
| F | 90 | 10 | — |

(20) Polycarbonate ex Enichem.
(21) ex. Aldrich

Example 10 demonstrates the utility of the method with a different polymer species (polycarbonate). Examples 10A–C were produced as melt extrudates, whilst examples 10D–F were produced as non-aqueous dispersions, as described in example 3. In all examples the temperature in the various regions was $T_1=270°$ C., $T_2=250°$ C., $T_3=200°$ C.

For examples 10A–C, the extrudate was dissolved in cyclohexane to produce a solution which was 20% by weight modified polymer, and a curing agent composition was added. For the non-aqueous dispersions, a curing agent composition was added. In all cases the compositions were then coated directly onto aluminium panels, subjected to a cure schedule (240° C. for 3 minutes) and assessed.

Results

| Composition | Viscosity (poise) | Cure Agent | MEK Rubs |
|---|---|---|---|
| A | 1706 | Cymel 350 (22) @ 40% by weight of polymer | 13 |
| B | 1706 | " plus 10% TRIS | 40 |
| C | 0.6 | Cymel 350 (22) @ 40% by weight of polymer | 100+ |
| D | 1706 | Desmodur N3400 (7) | 30 |
| E | (not determined) | " | 40 |
| F | 0.6 | " | 70 |

-continued

(22) ex. Dyno Cyanamid

The results show the utility of the method for a different polymer species (polycarbonate), and also the utility of a different multifunctional material (glutamic acid), as well as the benefit of adding the multifunctional material to the polymer before extrusion, and not to the curing agent composition. In particular, glutamic acid is heat sensitive, and is not processable by conventional methods.

EXAMPLE 11

| Composition | Nylon 6 (23) | Citric Acid | Zone Temp (° C.) | | |
|---|---|---|---|---|---|
| | | | $T_1$ | $T_2$ | $T_3$ |
| A | 100 | — | 273 | 230 | 220 |
| B | 100 | — | " | " | " |
| C | 95 | 5 | " | " | " |
| D | 100 | — | 280 | 230 | 200 |
| E | 95 | 5 | " | " | " |

(23) Nylon, formerly ex ICI Chemicals & Polymers

Example 11 demonstrates the utility of the method with a different polymer species (polyamides), which can be self curing compositions. Examples 11A–C were produced as melt extrudates, whilst examples 11D–E were produced as non-aqueous dispersions, as described in example 3.

For examples 11A–C, the extrudate was dissolved in triethylene glycol, and applied hot (100° C.) onto aluminium panels preheated to 80° C., and then subjected to a cure schedule 240° C. for three minutes). For the non-aqueous dispersions, these were directly applied hot (100° C.) to the preheated 80° C.) aluminium panel, and subject to a cure schedule (240° C. for 3 minutes).

Polyamides are naturally very solvent resistant, and so the coated panels were additionally subjected to the Pencil Hardness Test after first being boiled in a 5% acetic acid solution for ½ hour.

Results

| Composition | Viscosity (poise) | Curing Agent | MEK Rubs | Pencil Hardness (FAIL) |
|---|---|---|---|---|
| A | 1578 | (self curing) | 100+ | H |
| B | 1578 | 5 parts citric acid | 100+ | H |
| C | 1034 | (self curing) | 100+ | 9H |
| D | 1578 | " | 50 | — |
| E | 1034 | " | 100+ | — |

Although the compositions are self-curing, 5 parts citric acid was added to B to allow comparison against C. The utility of the method for polyamides is demonstrated, as well as the benefit of adding the multifunctional material (citric acid) before extrusion processing measured this time by the improvement in hardness found for example C over A and B. Example E shows a reduction in viscosity and improvement in solvent resistance over D.

EXAMPLE 12

An experiment was carried out to compare the effect of carrying out the quenched extrusion process of the present invention with an otherwise identical unquenched process on molecular weight and on the flow-out properties of the products. Polymer A was unreacted cleavable polymer starting material. Polymer B was the result of adding pentaerythritol and passing through an extruder initially at 290° C. and then quenched to 200° C. Polymer C was the result of adding pentaerythritol and passing through an extruder at 290° C. with no quenching.

Polymer A

PETI, 40% I (grade E193). Unreacted, undried polymer chips.

Polymer B (Quenched)

E193+5% by weight pentaerythritol+0.5% Fascat 4101.

Extruder set temperatures at 20 cm intervals through the extruder (200° C. heat-up zone, followed by 290° C. reaction zone, and finally a 200° C. quenched zone): 200-290-290-200-200-200-200-200° C.

Screw speed 100 rpm, throughput 1 kg/h.

Extrudate collected on metal dish, allowed to cool and ground in mortar and pestle.

Polymer C (Unquenched)

E193+5% pentaerythritol+0.5% Fascat 4101.

Extruder set temperatures at 20 cm intervals through the extruder (200° C. heat-up zone followed by 290° C. reaction zone): 200-290-290-290-290-290-290-290° C.

Screw speed 100 rpm, throughput 1 kg/h.

Extrudate was collected on a metal dish, allowed to cool and ground in a mortar & pestle.

The two samples were evaluated by viscosity (cone and plate rheometer) and gel permeation chromatography (in tetrahydrofuran, against polystyrene standards). In addition, the finely ground powder was dusted onto metal sheet and stoved to observe the flow-out.

| Viscosity at 200° C., poise | Polymer A | Polymer B | Polymer C |
| --- | --- | --- | --- |
| Viscosity at 200° C. (Poise) | 10000 | 16 | 170 |
| Molecular weight Mw | 69200 | 9300 | 54000 |
| Powder flow-out (after 100° C. for 2 min) | — | Smooth | Poor, Sandy |

Polymer B (with quenched temperature profile) has reduced molecular weight and viscosity compared to Polymer A (cleavable polymer starting material). Polymer C (with unquenched temperature profile) has increased molecular weight and the viscosity of sample 3 rises during the course of the experiment, indicating the onset of rising molecular weight towards thermodynamic equilibrium. Polymer C clearly shows the effect of the increased molecular weight in its poorer flow-out.

What is claimed is:

1. A coating composition comprising
   a self cross-linking functionalized polymer having functionally active cross-linking groups, the self cross-linking polymer further comprising the partial reaction product of
   a) a cleavable carbonyl polymer having a cleavable unit containing an activated carbonyl group adjacent to an oxygen or a nitrogen atom, the activated carbonyl group being in the polymer backbone, the cleavable polymer having a weight average molecular weight of greater than 10,000 and less than 300,000; and
   b) a polyester multifunctional compound, polymer or oligomer having a weight average molecular weight of less than 2,000, the polyester multifunctional compound, polymer or oligomer having at least one functionally reactive group capable of reacting with the cleavable carbonyl polymer to cleave the polymer at the activated carbonyl group and form a bond with the cleaved polymer, the polyester multifunctional compound, polymer or oligomer having at least one functionally active cross-linking group.

2. A coating composition comprising
   a self cross-linking functionalized polymer having functionally active cross-linking groups, the self cross-linking polymer further comprising the partial reaction product of
   a) a cleavable carbonyl polymer having a cleavable unit containing an activated carbonyl group adjacent to an oxygen or a nitrogen atom, the activated carbonyl group being in the polymer backbone, the cleavable polymer having a weight average molecular weight of greater than 10,000 and less than 300,000; and
   b) a polyester multifunctional compound, polymer or oligomer having a weight average molecular weight of between 50 and 500, the polyester multifunctional compound, polymer or oligomer having at least one functionally reactive group capable of reacting with the cleavable carbonyl polymer to cleave the polymer at the activated carbonyl group and form a bond with the cleaved polymer, the polyester multifunctional compound, polymer or oligomer having at least one functionally active cross-linking group.

3. A coating composition comprising
   a self cross-linking functionalized polymer having functionally active cross-linking groups, the self cross-linking polymer further comprising the partial reaction product of
   a) a cleavable carbonyl polymer having a cleavable unit containing an activated carbonyl group adjacent to an oxygen or a nitrogen atom, the activated carbonyl group being in the polymer backbone, the cleavable polymer having a weight average molecular weight of greater than 10,000 and less than 300,000; and
   b) a polyester multifunctional compound, polymer or oligomer having a weight average molecular weight of less than 2,000, the polyester multifunctional compound, polymer or oligomer having at least one functionally reactive group, selected from the group consisting of hydroxy, carboxy, amino, thio, epoxy and phenolic, silane and any combination thereof, capable of reacting with the cleavable carbonyl polymer to cleave the polymer at the activated carbonyl group and form a bond with the cleaved polymer, the polyester multifunctional compound, polymer or oligomer having at least one functionally active cross-linking group.

4. A coating composition comprising
   a self cross-linking functionalized polymer having functionally active cross-linking groups, the self cross-linking polymer further comprising the partial reaction product of
   a) a cleavable carbonyl polymer having a cleavable unit containing an activated carbonyl group adjacent to an oxygen or a nitrogen atom, the activated carbonyl group being in the polymer backbone, the cleavable polymer having a weight average molecular weight of greater than 10,000 and less than 300,000; and b) a polyester multifunctional compound, polymer or oligomer having a weight average molecular weight of between 50 and 500, the polyester multifunctional compound, polymer or oligomer having at least one functionally reactive group, selected from the group consisting of hydroxy, carboxy, amino, thio, epoxy and phenolic, silane and any combination thereof, capable of reacting with the cleavable carbonyl polymer to cleave the polymer at the activated carbonyl group and form a bond with the cleaved polymer, the polyester multifunctional compound, polymer or oligomer having at least one functionally active crosslinking group.

* * * * *